US012467566B2

United States Patent
Dudik et al.

(10) Patent No.: US 12,467,566 B2
(45) Date of Patent: Nov. 11, 2025

(54) IRRIGATION KINEMATIC JOINT

(71) Applicant: Lindsay Corporation, Omaha, NE (US)

(72) Inventors: Matthew John Dudik, Elkhorn, NE (US); Michael South, Council Bluffs, IA (US); Troy Hanson, Blair, NE (US)

(73) Assignee: LINDSAY CORPORATION, Omaha, NE (US)

( * ) Notice: Subject to any disclaimer, the term of this patent is extended or adjusted under 35 U.S.C. 154(b) by 553 days.

(21) Appl. No.: 17/861,045

(22) Filed: Jul. 8, 2022

(65) Prior Publication Data

US 2024/0011586 A1    Jan. 11, 2024

(51) Int. Cl.
  *F16L 27/08*  (2006.01)
  *A01G 25/09*  (2006.01)
  *B05B 1/20*   (2006.01)
  *F16L 27/04*  (2006.01)

(52) U.S. Cl.
  CPC ........ *F16L 27/0849* (2013.01); *A01G 25/092* (2013.01); *B05B 1/20* (2013.01); *F16L 27/04* (2013.01)

(58) Field of Classification Search
  CPC .................................................. F16L 27/0849
  USPC ................................................. 285/184–185
  See application file for complete search history.

(56) References Cited

U.S. PATENT DOCUMENTS

| | | | |
|---|---|---|---|
| 136,577 A * | 3/1873 | Worswick et al. | F16L 27/0849 285/331 |
| 918,144 A | 4/1909 | Greenlaw | |
| 1,205,195 A * | 11/1916 | Gumz | F16L 27/0849 239/419 |
| 2,256,845 A | 9/1941 | Lanninger | |
| 2,305,296 A | 12/1942 | Lanninger | |
| 3,456,964 A * | 7/1969 | Zierden | F16L 27/0849 285/98 |
| 3,738,687 A * | 6/1973 | Zimmerer | F16L 27/0849 285/373 |
| 3,994,514 A | 11/1976 | Zimmerer et al. | |

(Continued)

FOREIGN PATENT DOCUMENTS

| | | | | |
|---|---|---|---|---|
| EP | 1031312 A1 * | 8/2000 | | F16L 27/0849 |
| FR | 1394154 | 4/1965 | | |

(Continued)

OTHER PUBLICATIONS

Greenlaw, U.S. Pat. No. 918,144 entitled "Flexible Pipe Joint" issued Apr. 13, 1909.

(Continued)

*Primary Examiner* — Zachary T Dragicevich
*Assistant Examiner* — Fannie Kee
(74) *Attorney, Agent, or Firm* — HOVEY WILLIAMS LLP

(57) ABSTRACT

An irrigation system joint couples first and second adjacent pipe sections that are coaxial along a central axis when aligned. The joint comprises a first portion and a second portion. The first portion is for securing to the first pipe section and comprises an upwardly facing hemispherical surface. The second portion is for securing to the second pipe section and comprises a cavity that receives at least a portion of the hemispherical surface to form a contact line coincident with the central axis when the pipe sections are aligned.

11 Claims, 10 Drawing Sheets

(56) References Cited

U.S. PATENT DOCUMENTS

| | | | |
|---|---|---|---|
| 3,997,192 A | 12/1976 | Hansen | |
| 4,041,975 A | 8/1977 | Ames | |
| 4,161,331 A | 7/1979 | Hansen | |
| 4,266,732 A * | 5/1981 | Sage | F16L 27/0849 336/134 |
| 4,434,936 A | 3/1984 | Chapman et al. | |
| 4,540,202 A * | 9/1985 | Amphoux | F16L 27/0849 403/111 |
| 4,548,446 A * | 10/1985 | Warshawsky | F16L 27/0849 285/907 |
| 4,564,224 A * | 1/1986 | Korus | F16L 27/0849 285/272 |
| 4,569,481 A | 2/1986 | Davis et al. | |
| 4,629,129 A | 12/1986 | Rinkewich | |
| 5,275,444 A * | 1/1994 | Wythoff | F16L 27/0849 285/272 |
| 5,947,393 A | 9/1999 | Unruh | |
| 6,036,122 A | 3/2000 | Gerdes et al. | |
| 6,260,888 B1 * | 7/2001 | McLaughlin | F16L 27/0849 181/240 |
| 7,309,035 B2 | 12/2007 | Korus | |
| 7,384,008 B1 * | 6/2008 | Malsam | F16L 27/0849 239/731 |
| 8,257,184 B1 | 9/2012 | Cordes et al. | |
| 2002/0107582 A1 | 8/2002 | Pollak et al. | |

FOREIGN PATENT DOCUMENTS

| | | | | |
|---|---|---|---|---|
| GB | 752565 A | * | 7/1956 | F16L 27/0849 |
| GB | 2046858 A | * | 11/1980 | F16L 27/0849 |
| KR | 1020180096464 | | 8/2018 | |
| KR | 101900649 B1 | * | 9/2018 | F16L 27/0849 |
| WO | 2008067569 | | 6/2008 | |
| WO | 2022031424 | | 2/2022 | |

OTHER PUBLICATIONS

Lanniger, U.S. Pat. No. 2,256,845 entitled "Pipe Coupling" issued Sep. 13, 1941.

Lanniger, U.S. Pat. No. 2,305,296 entitled "Pipe Coupling" issued Dec. 15, 1942.

International Search Report and Written Opinion in related PCT Application PCT/US2023/069674 mailed Oct. 20, 2023, 10 pages.

* cited by examiner

IRRIGATION KINEMATIC JOINT

BACKGROUND

As an irrigation system moves across a field, small mounds and other variations on the ground cause pipe sections to apply torsional forces to one another causing stress on the pipe section joints and other components. Additionally, towers of the irrigation systems often get out of alignment due to the variations in their motor speeds causing further stress. Over time, the stress can result in damage to the irrigation system.

The background discussion is intended to provide information related to the present invention which is not necessarily prior art.

SUMMARY OF THE INVENTION

The present invention solves the above-described problems and other problems by providing an irrigation system joint, an irrigation system, and a method of coupling adjacent pipes that enable three-degrees of freedom between pipe sections, which reduces stress and damage to the irrigation system.

An irrigation system joint constructed according to an embodiment of the present invention is operable to couple adjacent pipe sections. The pipe sections include first and second pipe sections that are coaxial along a central axis when aligned. The joint comprises first and second portions with the first portion being securable to the first pipe section and comprising an upwardly facing hemispherical surface.

The second portion is for securing to the second pipe section and comprises a cavity that receives at least a portion of the hemispherical surface to form a contact line coincident with the central axis when the pipe sections are aligned. The contact line between the hemispherical surface and the cavity allows the pipe sections three degrees of freedom relative to one another, which reduces the stress that the pipe sections impose on one another during operation.

A method of coupling adjacent pipes of an irrigation system according to an embodiment of the invention comprises securing a first portion of a joint to a first pipe section, the first portion comprising an upwardly facing hemispherical surface; securing a second portion of the joint to a second pipe section, the second portion including a cavity; and coupling the second portion to the first portion so that the cavity and hemispherical surface form a contact line coincident with a central axis of the pipe sections when the pipe sections are aligned.

An irrigation system constructed according to an embodiment of the present invention broadly comprises a plurality of mobile support towers, a plurality of pipe sections, and a joint. The support towers are configured to move across a field, and the pipe sections are supported above the field by the support towers. The pipe sections include a first pipe section with a first end extending along a central axis, and a second pipe section with a second end adjacent to and coaxial with the first end of the first pipe section when the pipe sections are aligned.

The joint pivotally connects the two pipe sections and comprises a sleeve, a first portion, and a second portion. The sleeve is configured to provide a sealed fluid connection between the first end of the first pipe section and the second end of the second pipe section. The first portion is secured to the first end of the first pipe section and has an upwardly facing hemispherical surface that intersects the central axis of the first pipe section. The second portion is secured to the second end of the second pipe section and has a cavity that receives at least a portion of the hemispherical surface of the first portion.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
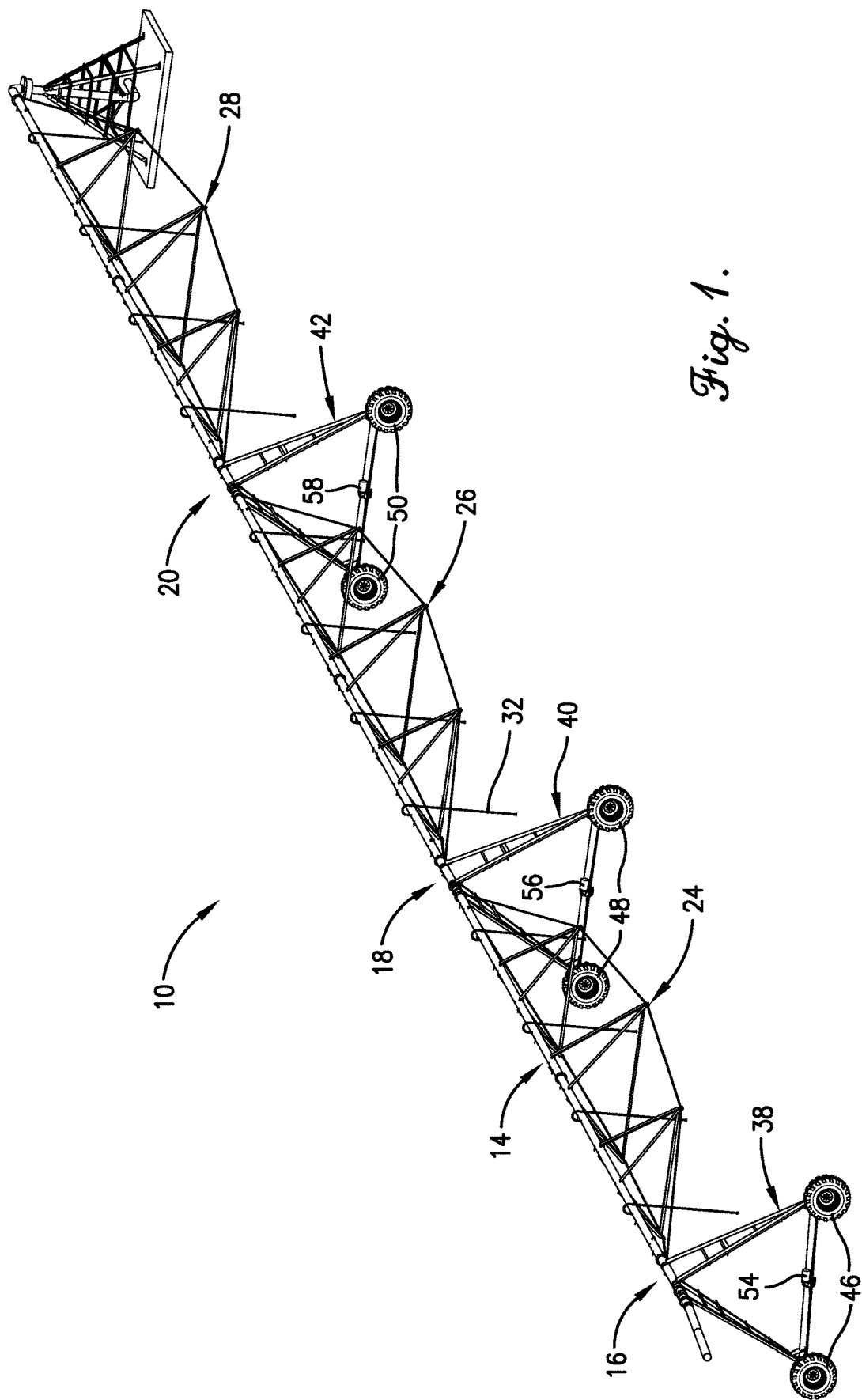
FIG. 1 is a perspective view of an irrigation system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an irrigation system 10 constructed in accordance with an embodiment of the invention is illustrated. The illustrated irrigation system 10 is a pivot irrigation system, but can be any other irrigation system, such as a lateral move irrigation system. The irrigation system 10 may have access to a hydrant, well, water tank, or other source of water and may also be in fluid communication with a tank or other source of agricultural products to inject fertilizers, pesticides and/or other chemicals into the water for application during irrigation.

The irrigation system 10 may comprise a number of spaced-apart mobile towers 16, 18, 20, a fluid-distribution conduit 14 in fluid communication with the water source and supported by the towers 16, 18, 20 above a field, a plurality of truss sections 24, 26, 28 or other supports to form a number of interconnected spans that help support the conduit 14, and a plurality of fluid emitters 32 that are in fluid communication with the conduit 14.

The mobile towers 16, 18, 20 support the conduit 14 and carry the conduit 14 and emitters 32 across the field. Each mobile tower 16, 18, 20, includes a frame 38, 40, 42 for supporting a portion of the conduit 14 and wheels 46, 48, 50 rotatably attached to the frame 38, 40, 42. One or more of the towers 16, 18, 20 may include a motor 54, 56, 58 for driving the wheels 46, 48, 50 of its respective tower 16, 18, 20.

Figure 2:
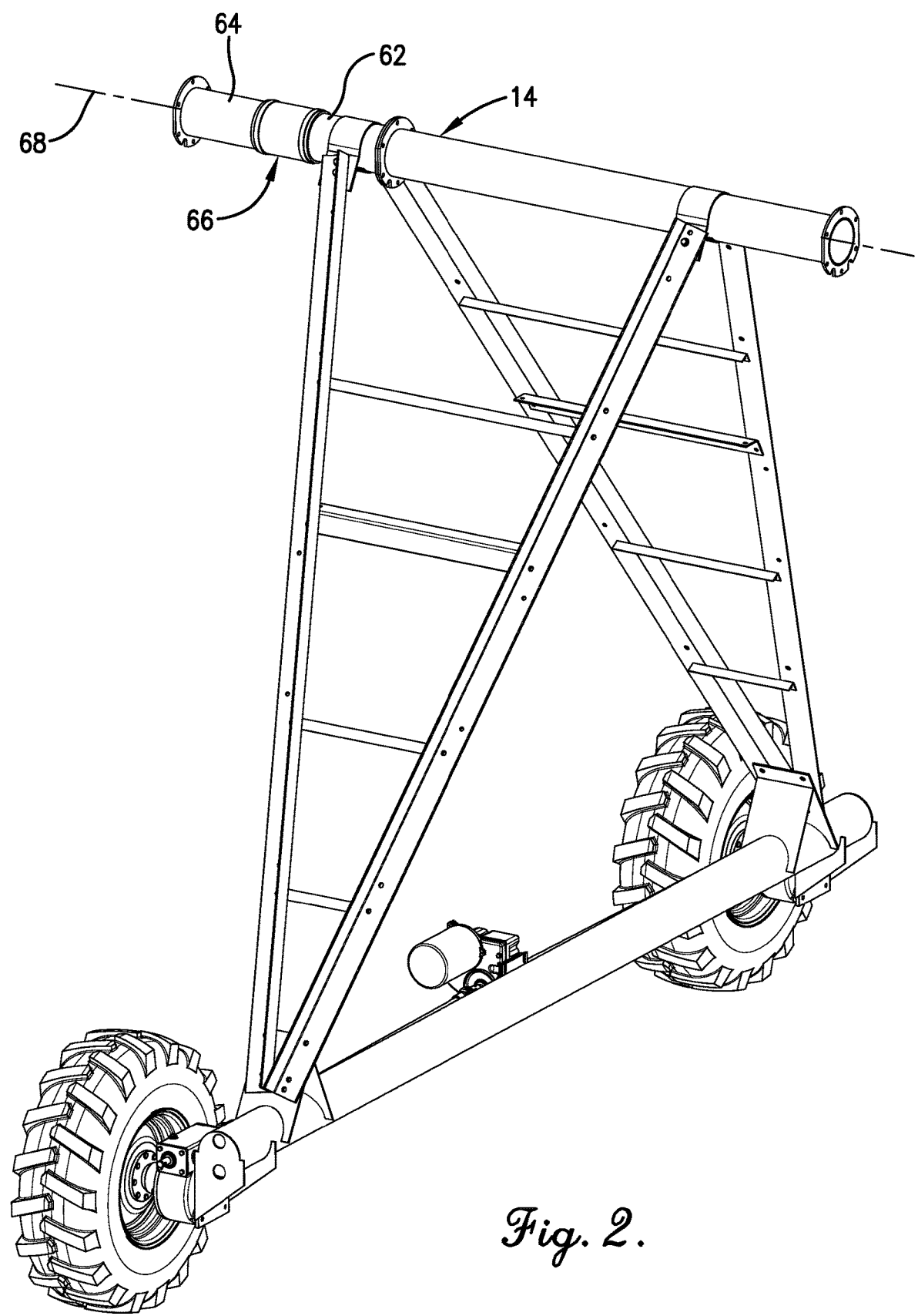
FIG. 2 is an exemplary tower of the irrigation system of FIG. 1 with a joint constructed in accordance with embodiments of the present invention.
Figure 3:
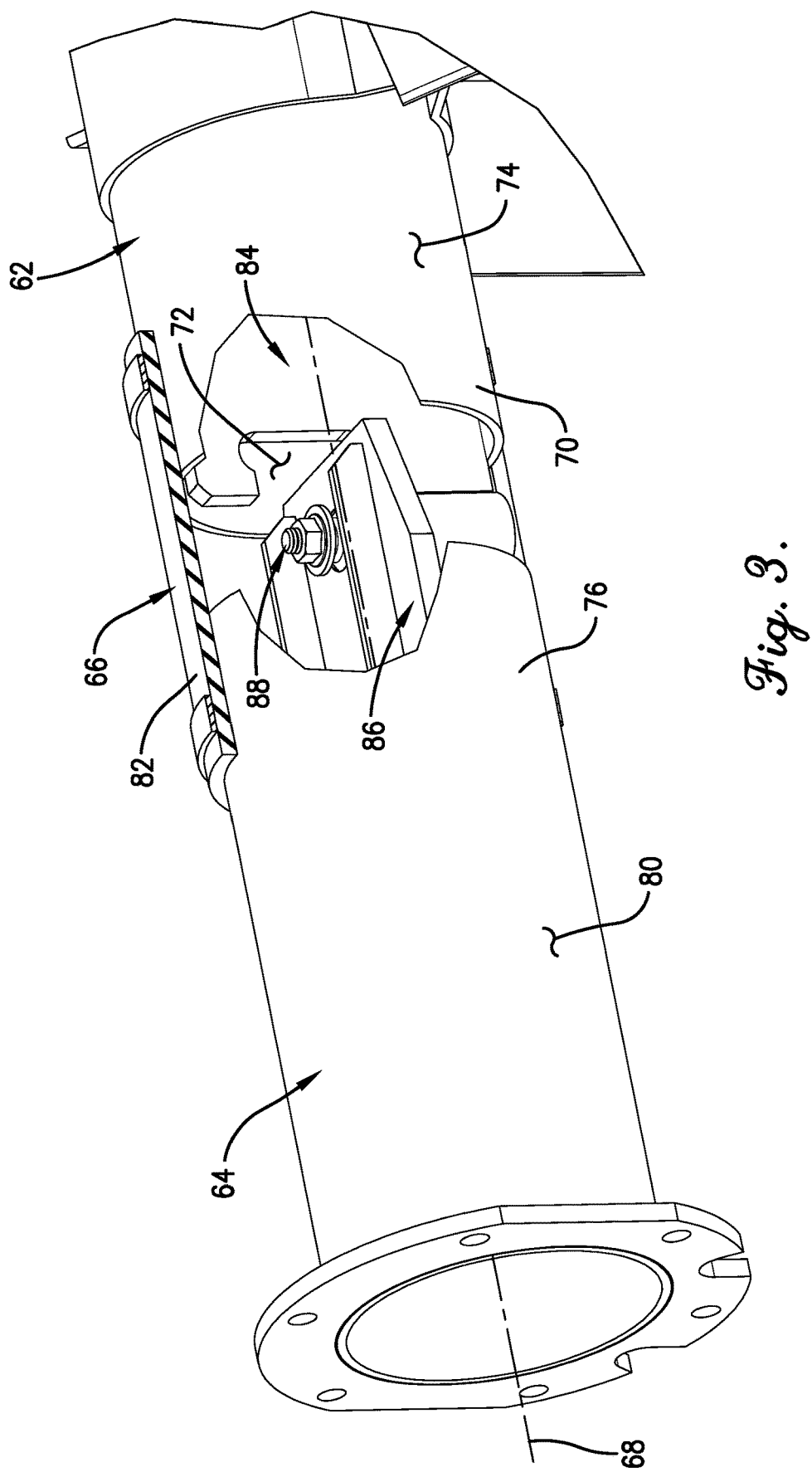
FIG. 3 is a partial view of the tower of FIG. 2 with portions hidden to reveal interior features of the joint.

The conduit 14 spans across the irrigation system 10 and carries water and/or other fluids to the emitters 32. Water and/or other fluids may travel from the water source to the conduit 14, which directs them to the emitters 32. Turning to FIG. 2, the conduit 14 may comprise a plurality of pipe sections 62, 64 connected via one or more joints 66. The first pipe section 62 is adjacent to the second pipe section 64, and the pipe sections 62, 64 are coaxial along a central axis 68 when aligned. Turning to FIG. 3, the first pipe section 62 may have a first end 70 extending along the central axis 68, an inner surface 72, and an outer surface 74. The second pipe section 64 has a second end 76 that is adjacent to the first end 70 of the first pipe section 62, an inner surface 78 (depicted in FIG. 4), and an outer surface 80.

The joint 66 comprises a sleeve 82, a first portion 84, a second portion 86, and fastening element 88. The sleeve 82 is configured to provide a sealed fluid connection between the first pipe section 62 and the second pipe section 64. For example, the sleeve 82 may engage the outer surface 74 of the first pipe section 62 and the outer surface 80 of the second pipe section 64. However, the sleeve 82 may provide a fluid connection between the pipe sections 62, 64 any number of ways without departing from the scope of the present invention.

Figure 4:
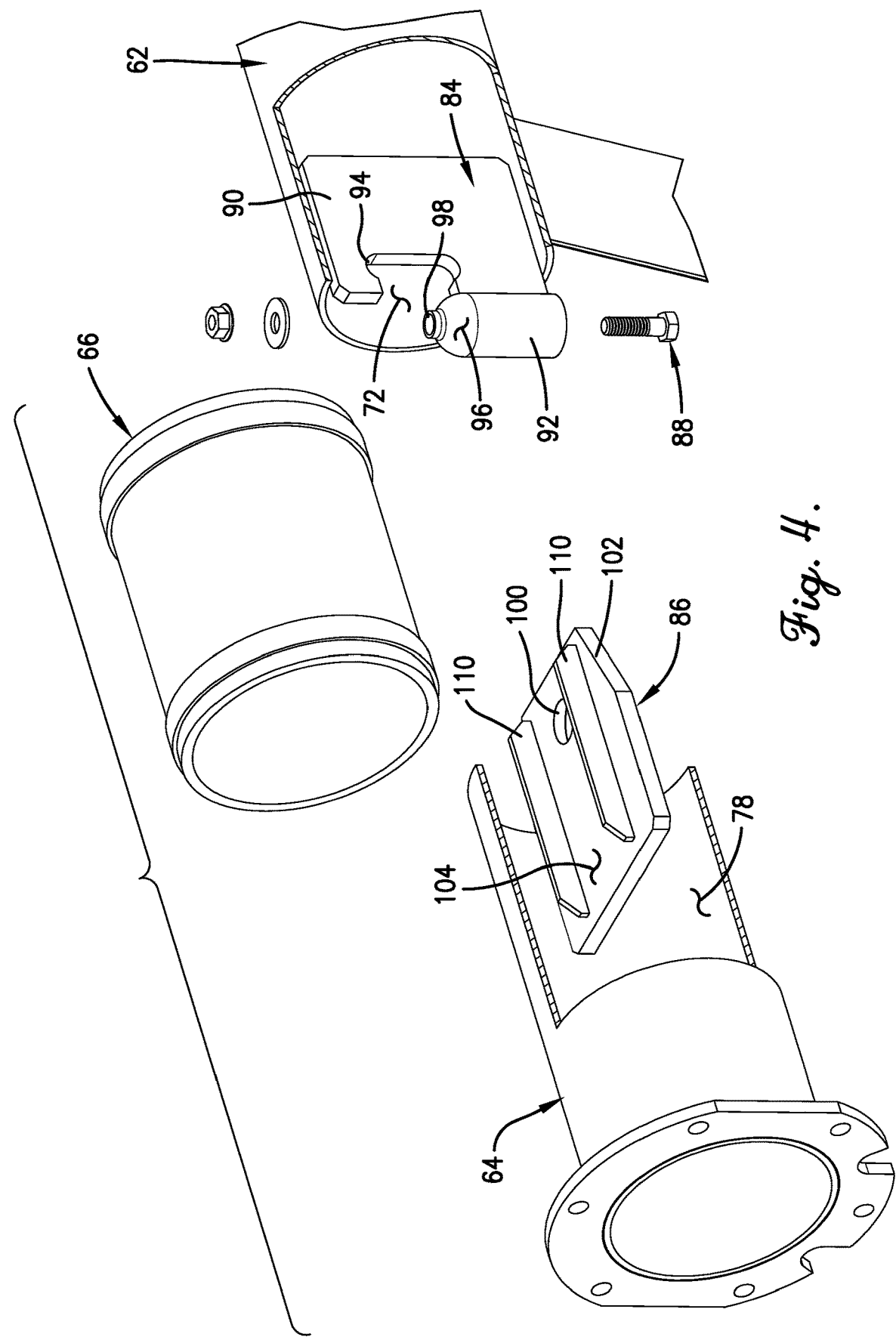
FIG. 4 is an elevated exploded view of the joint of FIG. 2.

Turning to FIG. 4, the first portion 84 is secured the first pipe section 62 and comprises a plate 90 and a vertically extending pin 92. The first portion 84 may be secured to the first pipe section 62 via welding. For example, the plate 90 may be welded to the inner surface 72 of the first pipe section 62. The plate 90 may extend vertically and include a slot 94 that allows a portion of the second portion 86 to pass through, as discussed in more detail below. The pin 92 is attached to the plate 90 and includes an upwardly facing top hemispherical surface 96 that intersects the central axis 68 of the first pipe section 62. The pin 92 may define a hole 98 extending through its length and through the hemispherical surface 96.

Figure 5:
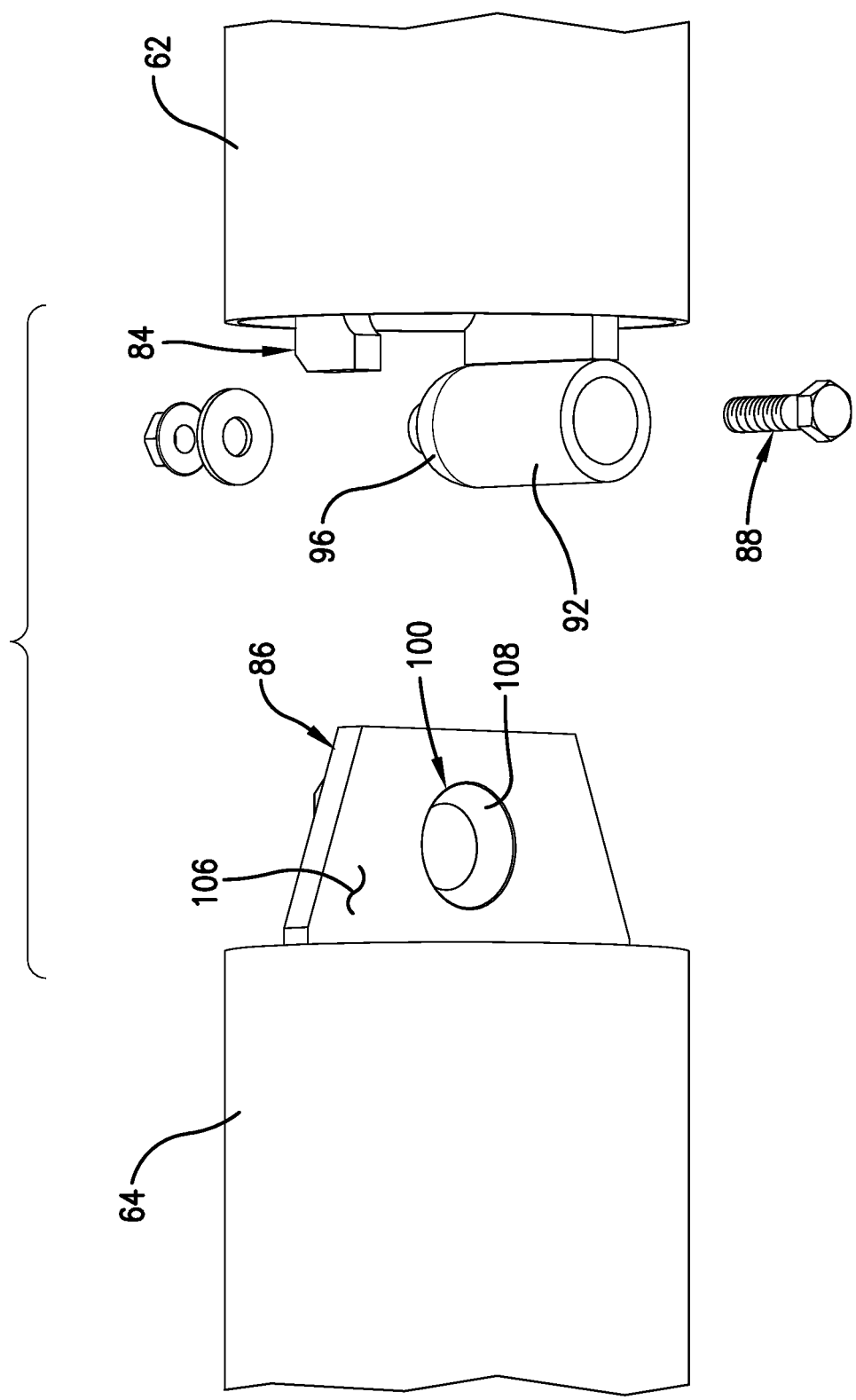
FIG. 5 is a lowered exploded view of the joint of FIG. 2.

The second portion 86 is secured to the second pipe section 64 and comprises a cavity 100 that receives at least a portion of the hemispherical surface 96 to form a contact line coincident with the central axis 68 when the pipe sections 62, 64 are aligned. The second portion 86 may comprise a horizontal plate 102 with a top surface 104 and a bottom surface 106 (depicted in FIG. 5) with the cavity 100 extending from the top surface 104 to the bottom surface 106. The plate 102 may be secured to the inner surface 78 of the second pipe section 64. The plate 102 may include stiffeners 110 for increasing the strength of the plate 102. As shown in FIG. 5, the cavity 100 may comprise a frustoconical countersink 108 on the bottom surface 106 of the plate 102.

Figure 6:
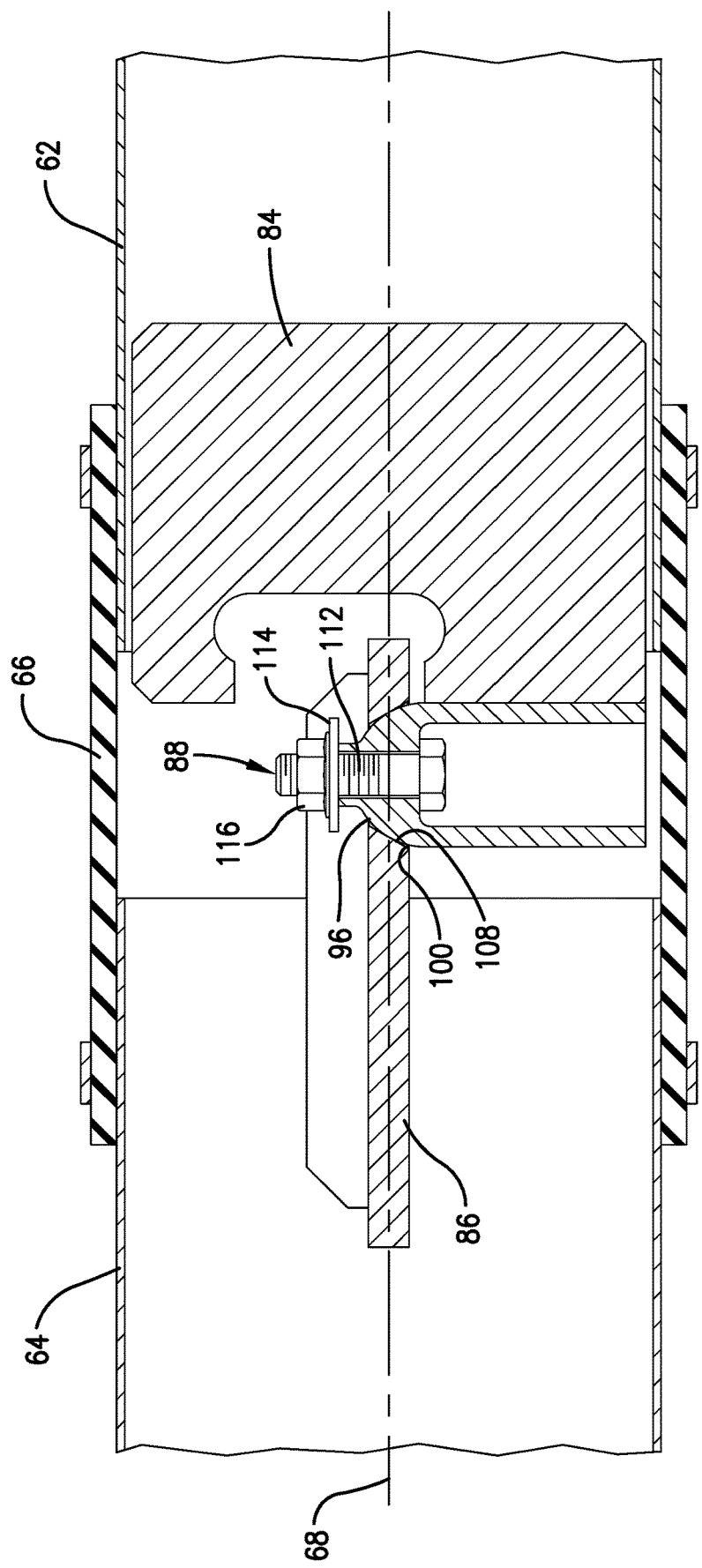
FIG. 6 is a partial cross-sectional view of the tower and the joint of FIG. 2.

The fastening element 88 is configured to secure the first portion 84 and the second portion 86 together. Turning to FIG. 6, the fastening element 88 may comprise a threaded portion 112 extending vertically from the hemispherical surface 96 of the first portion 84 through the cavity 100 of the second portion 86 and a capture ring 114 and nut 116 configured to engage the threaded portion 112. The fastening element 88 may be a fastener, such as a bolt, that extends through the hole 98 defined by the pin 92 of the first portion 84 and the cavity 100 formed in the horizontal plate 102 of the second portion 86.

Figure 7:
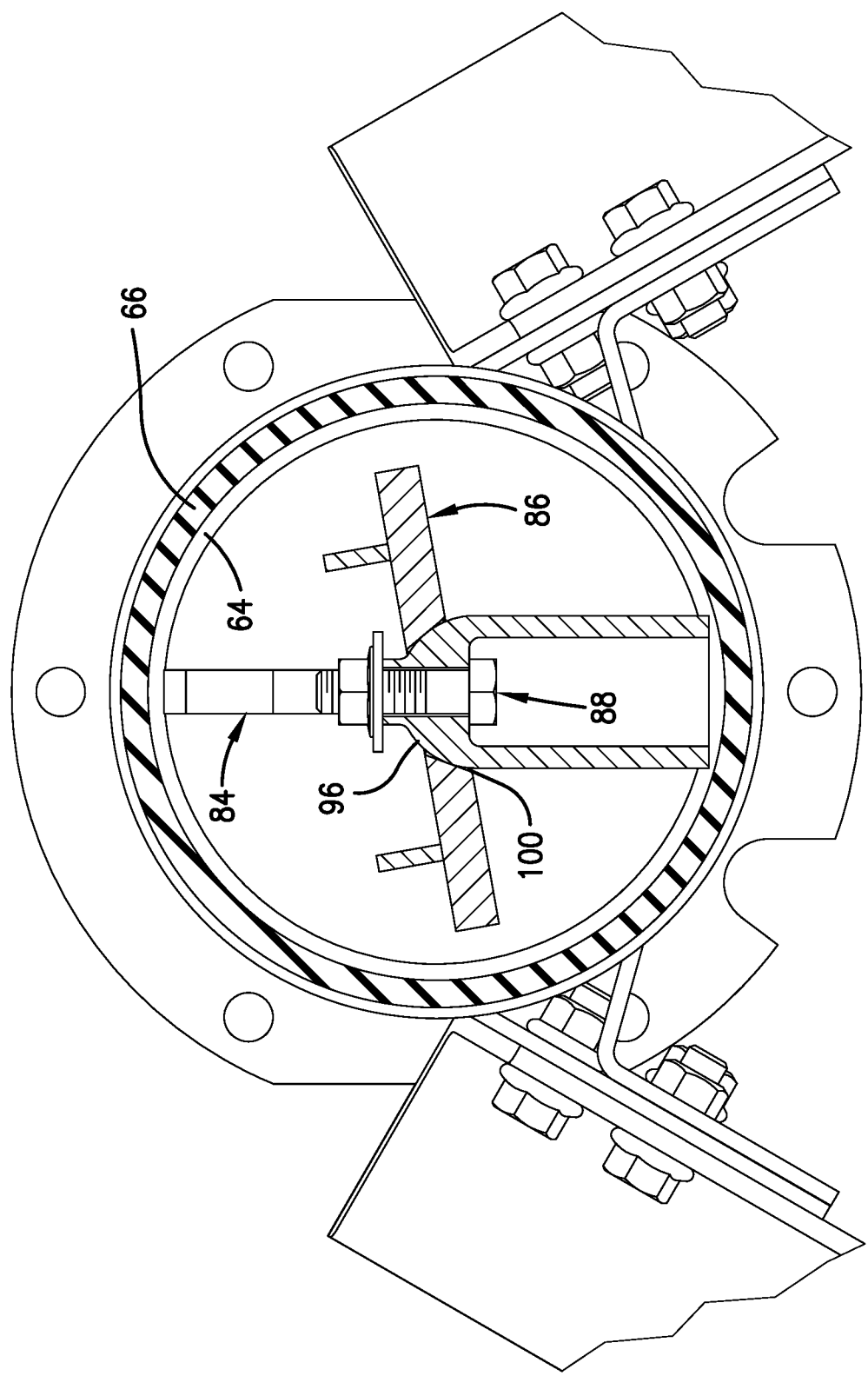
FIG. 7 is a partial view of the tower and the joint of FIG. 2 with pipe sections at an angle along a first plane.
Figure 8:
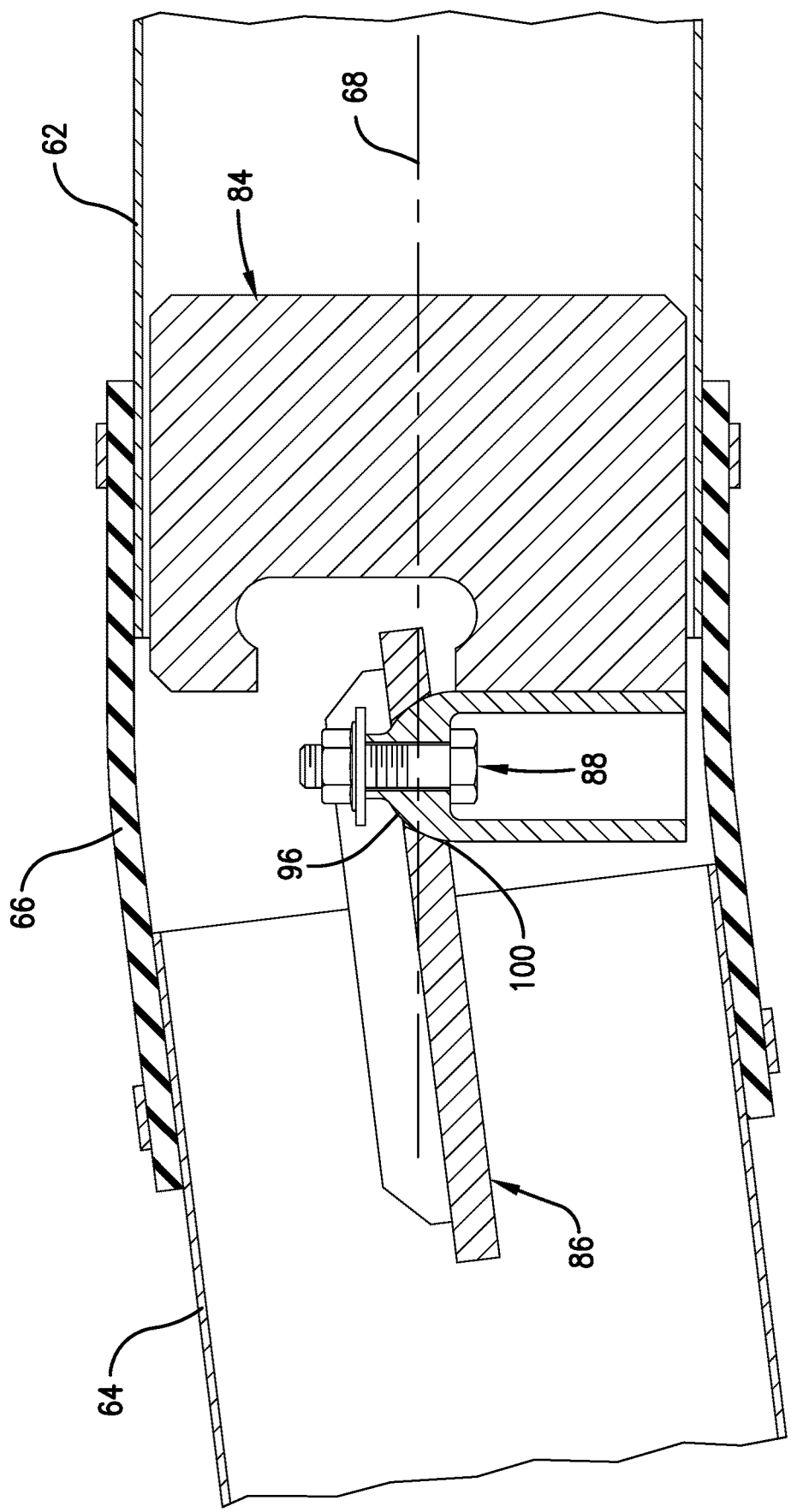
FIG. 8 is a partial cross-sectional view of the tower and the joint of FIG. 2 with pipe sections at an angle along a second plane.
Figure 9:
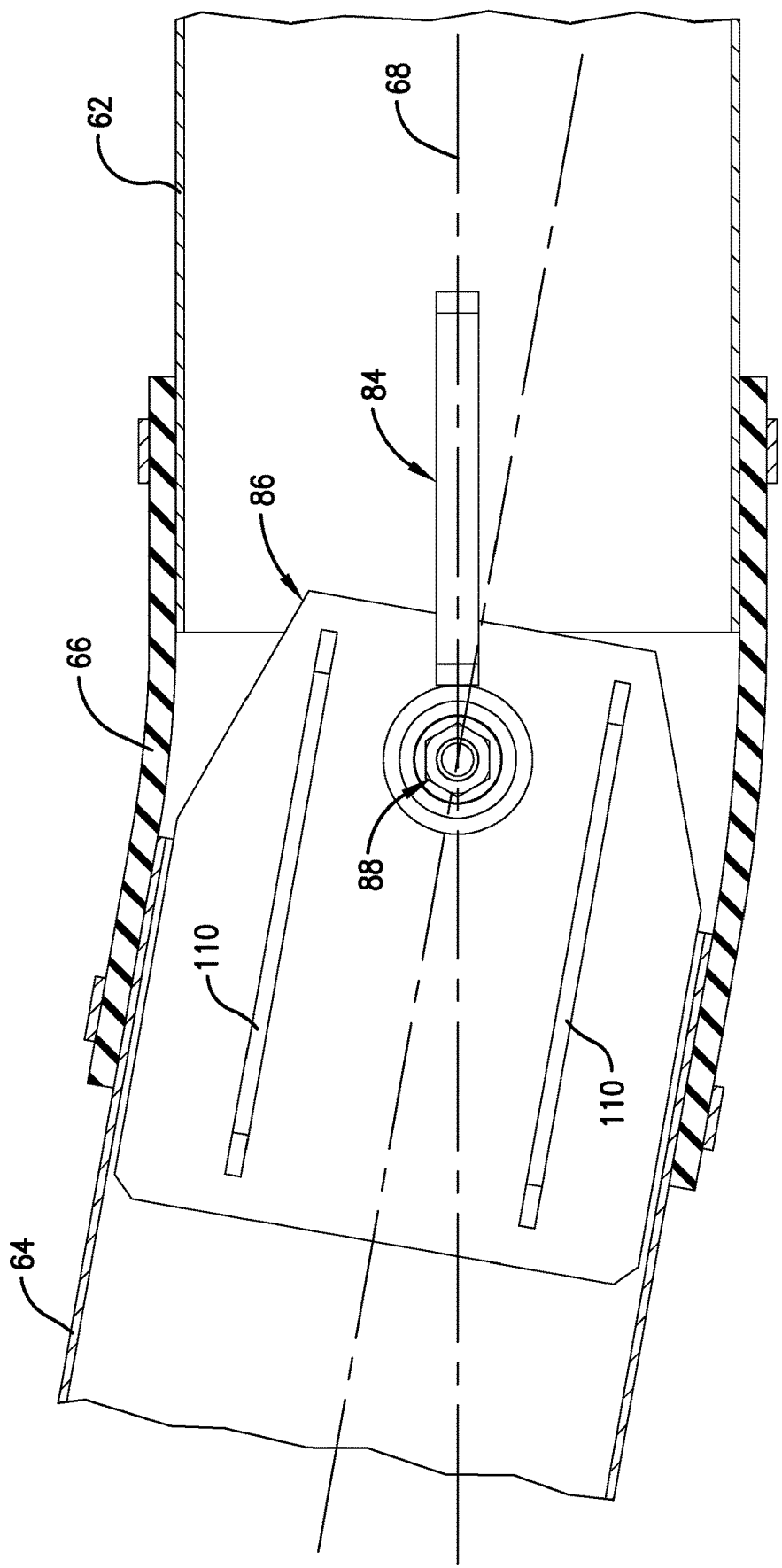
FIG. 9 is a partial cross-sectional view of the tower and the joint of FIG. 2 with pipe sections at an angle along a third plane.

By forming a line of contact coincident with the central axis 68 of the pipe sections 62, 64 via the hemispherical surface 96 and the cavity 100, the two pipe sections 62, 64 have three degrees of freedom to move relative to one another. This enables up to 30% of torsion in either direction. For example, the joint 66 enables two or more towers supporting the pipe sections 62, 64 to experience up to a 30% difference in transverse slopes or be otherwise axially rotated up to 17 degrees apart from each other, as depicted FIG. 7. Further, the joint 66 enables the pipe sections 62, 64 to withstand up to 30% differences in lateral slopes. For example, the joint 66 enables one of the pipe sections 64 to be at a different elevation than the other pipe section 62. Particularly, the joint 66 may enable the pipe sections 62, 64 to be on slopes having up to a 30% difference in either direction, or otherwise allow one of the pipe sections 62, 64 to be at an angle of up to 17 degrees from the central axis 68 in either direction, as depicted in FIG. 8. Additionally, the joint 66 enables tower misalignment up to five feet in either direction. In other words, one of the towers 16, 18, 20 supporting one of the pipe sections 62, 64 may be ahead of or behind the adjacent tower supporting the other one of the pipe sections 62, 64 by five feet or off by up to 2.5 degrees, as depicted in FIG. 9. Thus, the joint 66 enables a more robust and long-lasting irrigation system 10.

Figure 10:
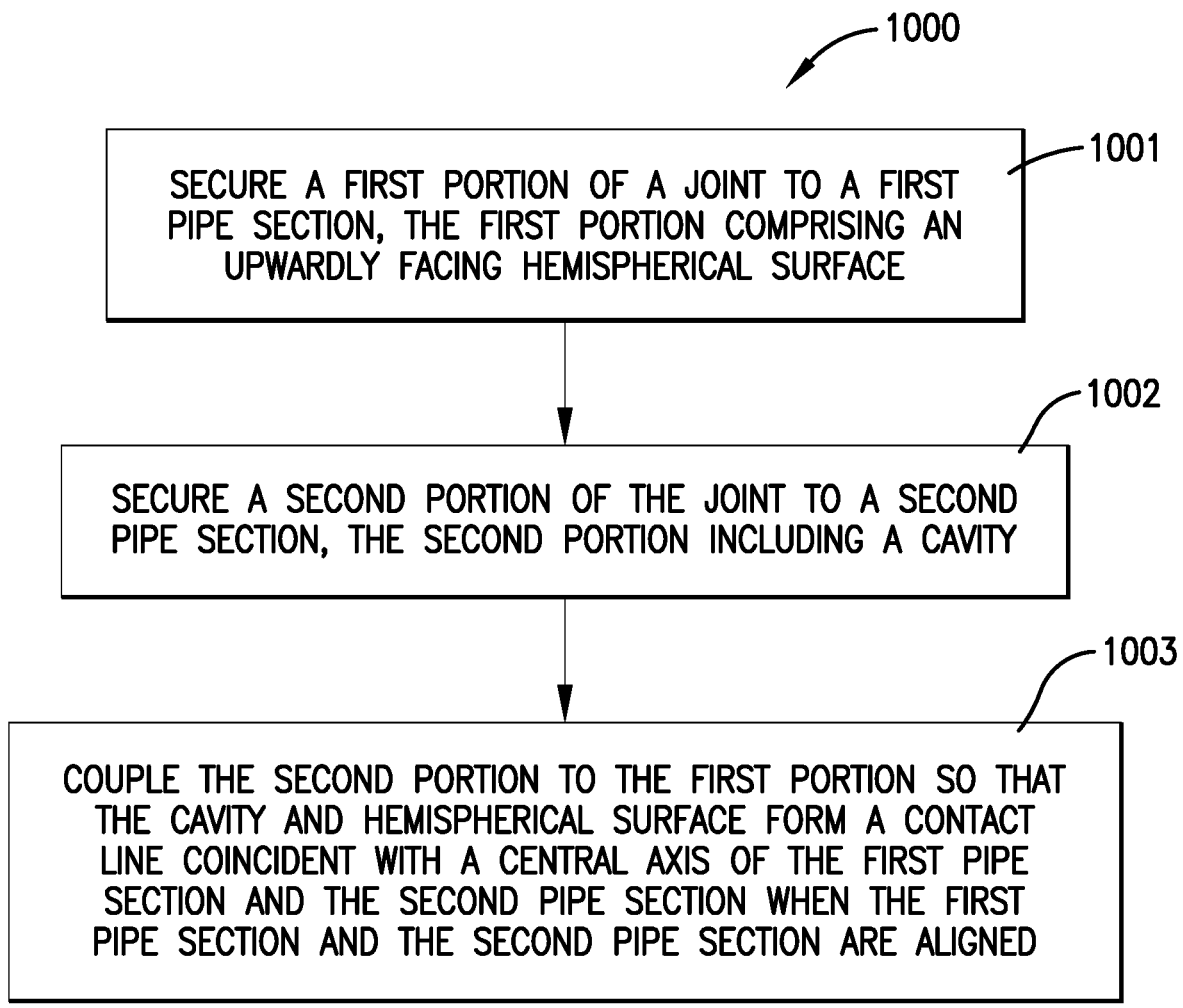
FIG. 10 is a flowchart depicting exemplary steps of a method according to an embodiment of the present invention.

The flow chart of FIG. 10 depicts the steps of an exemplary method 1000 of coupling adjacent pipe sections of an irrigation system. In some alternative implementations, the functions noted in the various blocks may occur out of the order depicted in FIG. 10. For example, two blocks shown in succession in FIG. 10 may in fact be executed substantially concurrently, or the blocks may sometimes be executed in the reverse order depending upon the functionality involved. In addition, some steps may be optional.

Referring to step 1001, the first portion of the joint is secured to the first pipe section. The first portion may be secured to the inner surface of the first pipe section via welding. This step may include securing the plate to the inner surface of the first pipe section and securing the upwardly extending pin to the plate. The first portion may be secured to the first pipe section so that the upwardly facing hemispherical surface intersects the central axis of the first pipe section. The hole of the pin may be formed therein and extend through the length of the pin and the hemispherical surface. The slot of the plate may be formed therein for allowing the second portion to freely rotate on the hemispherical surface of the first portion.

Referring to step 1002, the second portion of the joint may be secured to the second pipe section. The horizontal plate may be secured to the inner surface of the second pipe section with the frustoconical countersink facing downwards. This step may include securing the stiffeners to the plate.

Referring to step 1003, the second portion is coupled to the first portion so that the cavity and hemispherical surface form a contact line coincident with a central axis of the first pipe section and the second pipe section when the first pipe section and the second pipe section are aligned. This step may include inserting the fastener through the hemispherical surface and the cavity and securing the capture ring to the fastener so that the capture ring maintains the second portion in engagement with first portion.

The method 1000 may include additional, less, or alternate steps and/or device(s), including those discussed elsewhere herein. For example, the method may include attaching the sleeve to the first pipe section and the section pipe section to provide a sealed fluid connection between the first pipe section and the second pipe section.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An irrigation system joint for coupling a first pipe section adjacent to a second pipe section that are coaxial along a central axis when aligned, the joint comprising:
   a first portion for securing to the first pipe section and comprising an upwardly facing hemispherical surface,
   a second portion for securing to the second pipe section and comprising a cavity that receives at least a portion of the hemispherical surface to form a contact line coincident with the central axis when the first pipe section and the second pipe section are aligned, wherein the second portion has a top surface and a bottom surface and the cavity extends from the bottom surface to the top surface, and the first portion comprises a threaded element extending vertically from the hemispherical surface through the cavity; and
   a capture ring and a nut configured to engage the threaded element to secure the second portion to the first portion.

2. The irrigation system joint of claim 1, further comprising a sleeve configured to provide a sealed fluid connection between the first pipe section and the second pipe section.

3. The irrigation system joint of claim 1, wherein the cavity comprises a frustoconical countersink.

4. The irrigation system joint of claim 1, wherein the hemispherical surface includes a hole extending therethrough, and the threaded element comprises a bolt extending through the hole.

5. The irrigation system joint of claim 1, wherein the first pipe section includes an inner surface, and the first portion is secured to the inner surface of the first pipe section.

6. An irrigation system joint for coupling a first pipe section adjacent to a second pipe section that are coaxial along a central axis when aligned, the joint comprising:
   a first portion for securing to the first pipe section and comprising an upwardly facing hemispherical surface, and
   a second portion for securing to the second pipe section and comprising a cavity that receives at least a portion of the hemispherical surface to form a contact line coincident with the central axis when the first pipe section and the second pipe section are aligned, wherein the first pipe section includes an inner surface, and the first portion is secured to the inner surface of the first pipe section, and wherein the first portion comprises a vertical plate that is configured to be secured to the inner surface of the first pipe section, and a vertically extending pin attached to the plate and that supports the hemispherical surface.

7. The irrigation system joint of claim 1, wherein the second pipe section includes an inner surface, and the second portion is secured to the inner surface of the second pipe section.

8. The irrigation system joint of claim 7, wherein the second portion comprises a horizontal plate that is configured to be secured to the inner surface of the second pipe section.

9. A method of coupling adjacent pipes of an irrigation system, the method comprising:

securing a first portion of a joint to a first pipe section, the first portion comprising an upwardly facing hemispherical surface;

securing a second portion of the joint to a second pipe section, the second portion including a cavity;

coupling the second portion to the first portion so that the cavity and hemispherical surface form a contact line coincident with a central axis of the first pipe section and the second pipe section when the first pipe section and the second pipe section are aligned; and inserting a fastener through the hemispherical surface and the cavity and securing a capture ring to the fastener so that the capture ring maintains the second portion in engagement with first portion.

10. The method of claim 9, further comprising attaching a sleeve to the first pipe section and the section pipe section to provide a sealed fluid connection between the first pipe section and the second pipe section.

11. The method of claim 9, wherein the cavity comprises a frustoconical countersink.

* * * * *